United States Patent
Butler et al.

(10) Patent No.: US 10,185,084 B2
(45) Date of Patent: Jan. 22, 2019

(54) LAYERED GLASS STRUCTURES

(71) Applicants: Douglas Llewellyn Butler, Painted Post, NY (US); Matthew John Dejneka, Corning, NY (US); Daniel Warren Hawtof, Corning, NY (US); Dale Robert Powers, Painted Post, NY (US); Pushkar Tandon, Painted Post, NY (US)

(72) Inventors: Douglas Llewellyn Butler, Painted Post, NY (US); Matthew John Dejneka, Corning, NY (US); Daniel Warren Hawtof, Corning, NY (US); Dale Robert Powers, Painted Post, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 24 days.

(21) Appl. No.: 15/050,589

(22) Filed: Feb. 23, 2016

(65) Prior Publication Data
US 2017/0240454 A1    Aug. 24, 2017

(51) Int. Cl.
*G02B 6/02* (2006.01)
*G02B 6/10* (2006.01)
(Continued)

(52) U.S. Cl.
CPC ............ *G02B 6/10* (2013.01); *C03B 19/1453* (2013.01); *C03B 19/1469* (2013.01);
(Continued)

(58) Field of Classification Search
CPC ...... G02B 6/10; G02B 6/4479; C03B 37/027; C03B 37/018; C03B 37/01853; C03B 37/01876; H01S 3/0632
(Continued)

(56) References Cited

U.S. PATENT DOCUMENTS 4,793,842 A * 12/1988 Yokota .............. C03B 37/01211
                                                                 65/397
5,125,946 A    6/1992 Bhagavatula
(Continued)

FOREIGN PATENT DOCUMENTS

CA    2352378 C    5/2005

OTHER PUBLICATIONS

International Searching Authority Invitation to Pay Additional Fees PCT/US2016/047478 dated Oct. 10, 2016.
(Continued)

*Primary Examiner* — Kaveh C Kianni
*Assistant Examiner* — Hung Lam
(74) *Attorney, Agent, or Firm* — Kevin L. Bray (57) ABSTRACT

Layered glass structures and fabrication methods are described. The methods include depositing soot on a dense glass substrate to form a composite structure and sintering the composite structure to form a layered glass structure. The dense glass substrate may be derived from an optical fiber preform that has been modified to include a planar surface. The composite structure may include one or more soot layers. The layered glass structure may be formed by combining multiple composite structures to form a stack, followed by sintering and fusing the stack. The layered glass structure may further be heated to softening and drawn to control linear dimensions. The layered glass structure or drawn layered glass structure may be configured as a planar waveguide.

17 Claims, 7 Drawing Sheets

(51) Int. Cl.
*H01S 3/063* (2006.01)
*C03B 19/14* (2006.01)
*C03B 23/037* (2006.01)
*C03B 23/047* (2006.01)
*H01S 3/17* (2006.01)

(52) U.S. Cl.
CPC ........ *C03B 19/1492* (2013.01); *C03B 23/037* (2013.01); *C03B 23/047* (2013.01); *H01S 3/0632* (2013.01); *H01S 3/17* (2013.01); *C03B 2201/31* (2013.01); *C03B 2201/32* (2013.01); *C03B 2201/34* (2013.01); *C03B 2201/42* (2013.01)

(58) Field of Classification Search
USPC ........................................ 385/123, 129, 135
See application file for complete search history.

(56) References Cited

U.S. PATENT DOCUMENTS

| | | | |
|---|---|---|---|
| 5,196,041 A * | 3/1993 | Tumminelli | C03C 17/23 219/121.29 |
| 5,667,547 A | 9/1997 | Chistiansen et al. | |
| 5,841,928 A | 11/1998 | Maxwell et al. | |
| 5,992,100 A | 11/1999 | Sidney | |
| 6,606,883 B2 | 8/2003 | Hrdina | |
| 6,736,633 B1 | 5/2004 | Dawson | |
| 6,743,011 B2 | 6/2004 | Bakshi | |
| 6,837,076 B2 | 1/2005 | Hawtof | |
| 8,746,013 B2 | 6/2014 | Geremew | |
| 2002/0157420 A1 | 10/2002 | Hrdina et al. | |
| 2003/0113679 A1* | 6/2003 | Bakshi | C03B 37/0142 431/154 |
| 2003/0167796 A1* | 9/2003 | Hawtof | C01B 13/20 65/17.4 |
| 2004/0114894 A1 | 7/2004 | Andrus et al. | |
| 2006/0046075 A1 | 3/2006 | Maul et al. | |
| 2009/0133445 A1* | 5/2009 | Haruna | C03B 37/018 65/393 |
| 2010/0081554 A1 | 4/2010 | Huenermann | |
| 2011/0200292 A1 | 8/2011 | Filgas | |
| 2013/0000840 A1* | 1/2013 | Dawes | C03B 37/01211 156/294 |
| 2013/0209047 A1 | 8/2013 | Atar et al. | |

OTHER PUBLICATIONS

International Search Report and Written Opinion PCT/US2016/047478 dated Dec. 19, 2016.

Liu, C.-X. et al., Optical properties of Yb3+-doped silicate glasses waveguides formed by low-dose oxygen ion implantation and effects of annealing, Optik, 124 (2013), 1783-1786.

* cited by examiner

LAYERED GLASS STRUCTURES

PRIORITY CLAIM

This application claims priority from U.S. Patent Application Ser. No. 62/131,283, filed Mar. 11, 2015, the disclosure of which is hereby incorporated by reference in its entirety herein. This application also claims priority from U.S. Patent Application Ser. No. 62/207,992, filed Aug. 21, 2015, the disclosure of which is hereby incorporated by reference in its entirety herein.

FIELD

This description relates to structure with multiple glass layers. More particularly, this description relates to waveguides having a core glass layer surrounded by cladding glass layers. Most particularly, this description relates to planar waveguides having a rare earth doped core glass layer and surrounding undoped cladding glass layers.

BACKGROUND

Waveguides are widely used as laser amplifiers in optical systems. Waveguides consist of a high index core region encased between low index cladding regions. Waveguide lasers receive an input laser beam and amplify it to provide a higher power output beam. Amplification occurs in the core region, which is a gain medium that boosts the power of the input laser beam. The core region typically includes a matrix that incorporates an optical center (e.g. rare earth ion) that provides the gain. The matrix can be a crystalline or glass material and the optical center is introduced as a dopant. Crystalline materials include single crystals and ceramics. Representative crystalline gain media include oxide matrix materials (e.g. YAG, $YVO_4$) doped with rare earths and representative glass gain media include oxide glass matrix materials (e.g. silica or modified silica) doped with rare earths.

Recent interest in high energy lasers has motivated efforts to develop waveguide lasers with sufficient gain to provide output powers of several tens of kilowatts up to a few megawatts. High gain can be achieved through high doping levels of the optical center that provides gain and/or by scaling up the size of the gain medium to increase the optical path length through the waveguide. Crystalline gain media typically permit higher doping levels than glass gain media, but are difficult to scale up in size and typically produce higher scattering losses than glass gain media. Optical centers such as rare earth ions typically have lower solubility and lower doping concentrations in glass gain media, but glass gain media are easier to scale up in size than crystalline gain media and exhibit lower scattering losses.

Efforts to develop waveguides based on crystalline gain media for high power laser applications have had limited success because of the difficulty in scaling up the size of crystalline materials and the long process times needed to produce large scale crystalline media. Glass gain media with large dimensions are available, but are expensive when made with existing manufacturing techniques. There is a need for a low cost method for producing glasses for waveguides.

SUMMARY

The present disclosure describes fabrication of glass structures with multiple glass layers. The glass structures can be used as waveguides and include a high index core layer and a low index cladding layer. In one embodiment, the waveguide is a planar waveguide with a central high index core layer positioned between a lower index upper cladding layer and a lower index lower cladding layer. The core and cladding layer(s) are glasses that differ in composition. The core layer may include a silica-based glass with rare earth dopants. The cladding layer(s) are silica-based glass. Silica-based glasses include pure silica or modified silica. Modified silica includes silica modified with titania, germania, or alumina.

The process used to fabricate the glass structure includes continuous deposition of soot on to a dense glass substrate. The dense glass substrate and soot generator are in relative motion to each other during soot deposition to form a composite structure including the dense glass substrate and a porous soot layer in a continuous process. A porous soot layer may be deposited on one or more surfaces of the dense glass substrate to form a multi-layer composite structure with two or more layers. The composite structure may be consolidated to form a densified layered structure. The densified layered structure may constitute a preform from which a waveguide may be drawn. In other embodiments, the densified layered structure may be fused with a pre-existing glass monolith to add an additional layer. In another embodiment, two or more multi-layer composite structures may be independently consolidated and then fused to form a densified layered structure. Alternatively, the two or more multi-layer composite structures may be combined before consolidation and fused as a combination to form a densified layered structure.

The present description extends to:
A method for making a layered glass structure comprising:
  forming a composite structure, said composite structure including a first soot layer on a dense glass substrate, said first soot layer having a thickness of at least 100 µm;
  preparing a layered glass structure from said composite structure, said preparing including consolidating said first soot layer; and
  drawing said layered glass structure, said consolidated first soot layer having a thickness in said drawn layered glass structure of at least 10 µm.

The present description extends to:
A method for making a layered glass structure comprising:
  forming a first composite structure, said first composite structure including a first soot layer on a first dense glass substrate, said first soot layer having a thickness of at least 100 µm;
  forming a second composite structure, said second composite structure including a second soot layer on a second dense glass substrate, said second soot layer having a thickness of at least 100 µm;
  forming a stacked structure by stacking said first composite structure and said second composite structure, said stacking including contacting said first soot layer with said second soot layer.

The present description extends to:
A method for making a layered glass structure comprising:
  forming a first composite structure, said first composite structure including a first soot layer on a first dense glass substrate, said first soot layer having a thickness of at least 100 µm;
  consolidating said first composite structure, said consolidating including consolidating said first soot layer;
  forming a second composite structure, said second composite structure including a second soot layer on a second dense glass substrate, said second soot layer having a thickness of at least 100 μm;

forming a stacked structure by stacking said consolidated first composite structure and said second composite structure, said stacking including contacting said consolidated first soot layer with said second soot layer.

The present description extends to:

A method for making a layered glass structure comprising:

forming a first composite structure, said first composite structure including a first soot layer on a first dense glass substrate, said first soot layer having a thickness of at least 100 μm;

forming a stacked structure by stacking a glass layer on said first soot layer.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Reference will now be made in detail to illustrative embodiments of the present description.

The present description provides layered structures with a glass core region and glass cladding regions. The present description also provides a low cost manufacturing process for making layered glass structures. The layered glass structures may be used as waveguides, amplifiers and/or lasers.

Figure 1:
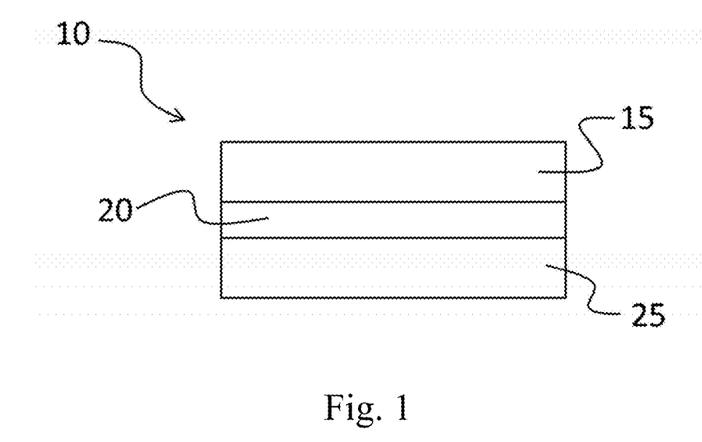
FIG. 1 is a schematic depiction of a planar waveguide.

In one embodiment, the layered glass structure is configured as a planar waveguide. FIG. 1 illustrates a planar waveguide in accordance with the present description. Planar waveguide 10 includes core layer 20, cladding layer 15, and cladding layer 25. Core layer 20 has a thickness in the range from 5 μm to 300 μm, or in the range from 10 μm to 300 μm, or in the range from 25 μm to 250 μm, or in the range from 50 μm to 200 μm, or in the range from 75 μm to 150 μm. Each of cladding layers 15 and 25 is thicker than core region 20. Cladding layers 15 and 25 have thicknesses at least 10 μm, or at least 25 μm, or at least 50 μm, or at least 100 μm, or at least 250 μm, or at least 500 μm, or at least 1 mm, or at least 2 mm, or at least 5 mm, or at least 10 mm, or at least 15 mm, or at least 20 mm, or in the range from 10 μm to 50 mm, or in the range from 25 μm to 40 mm, or in the range from 50 μm to 30 mm, or in the range from 100 μm to 25 mm, or in the range from 150 μm to 25 mm or in the range from 200 μm to 25 mm, or in the range from 250 μm to 25 mm, or in the range from 500 μm to 25 mm. Cladding layers 15 and 25 may have the same or different thicknesses.

Core layer 20 and cladding layers 15 and 25 include glass materials. Core layer 20 is a higher index glass material than cladding layers 15 and 25. Core layer 20 and cladding layers 15 and 25 may be doped or undoped glasses. The glasses may be doped or undoped silica. The glasses may be doped or undoped silica-based glass. Silica-based glasses include pure silica glass silica glass modified by one or more oxides, such $Al_2O_3$, $GeO_2$, $Ga_2O_3$, $B_2O_3$, $P_2O_5$, transition metal oxides (e.g. $TiO_2$), alkali metal oxides, and alkaline earth oxides, and silica glass doped with fluorine and/or chlorine.

Core layer 20 differs in composition from cladding layers 15 and 25. Cladding layers 15 and 25 may have the same or different composition. When planar waveguide 10 is implemented as a laser, core layer 20 includes a glass with a dopant and constitutes a gain medium for amplification. The glass with a dopant may be a silica-based glass with a dopant or pure silica glass with a dopant. The dopant may be a luminescent metal ion, such as a rare earth ion or a transition metal ion. In one embodiment, core layer 20 includes a rare earth doped silica glass or a rare earth doped modified silica glass and cladding layers 15 and 25 include undoped silica glass, undoped modified silica glass, or silica glass doped with fluorine and/or chlorine. Rare earth dopants include $Yb^{3+}$, $Er^{3+}$, $Tm^{3+}$, and $Nd^{3+}$. Inclusion of an oxide modifier (e.g. $Al_2O_3$, $GeO_2$, $TiO_2$, or $Ga_2O_3$) may improve the solubility of rare earth dopants in silica-based glass and may lead to higher gain through higher doping concentrations of rare earth ions. Rare earth dopants also act to increase the refractive index of silica-based glasses and facilitate attainment of the core-cladding index contrast needed for effective waveguiding.

The present description provides a batch process for making layered glass structures. The process includes depositing a soot layer on a dense glass substrate. The dense glass substrate may have a composition corresponding to the core layer of a layered glass structure or a composition corresponding to a cladding layer of the layered glass structure. In one embodiment, the dense glass substrate has a planar surface and soot deposition occurs on the planar surface. The dense glass substrate may be a rectangular slab or an arbitrary shape having a planar surface.

The soot used to form the soot layer on the dense glass substrate is supplied by a soot generator. In one embodiment, the soot generator is a burner and soot is produced by delivering a soot precursor to the burner and reacting or decomposing the soot precursor to form soot particles for deposition on the dense glass substrate.

Various devices and processes for generating soot particles known in the art can be used. Soot particles are typically transferred to the deposition surface in the form of soot stream. Examples of the soot-generating devices that can be used in various embodiments of the process include flame hydrolysis burners, such as those typically used in the IVD, OVD and VAD and planar deposition processes known in the art. Suitable burner configurations are disclosed in U.S. Pat. Nos. 6,606,883, 5,922,100, 6,837,076, 6,743,011 and 6,736,633, the disclosures of which are incorporated herein by reference in their entirety.

The soot generator may include a single burner or multiple burners. An example burner has an output surface having length l and width w. The output surface may include N columns of gas orifices where N can range from 1 to 20 or more. In an embodiment, each orifice includes a 0.076 cm diameter hole. The length l of the output surface may range from about 2.5 to 30.5 cm or more, and the width may range from 0.1 to 7.5 cm. Optionally, multiple burners can be configured into a burner array to produce a substantially continuous stream of soot particles over the length and width of the array. The number of burners and/or dimensions of the burner array may be adjusted or configured to provide soot coverage over a pre-determined region of the deposition surface of the dense glass substrate.

A burner array, for example, may comprise a plurality of individual burners (e.g., placed end-to-end) configured to form and deposit a temporally and spatially uniform layer of soot particles. The burner array may be a linear array that includes a plurality of modules positioned along a common direction to provide soot over an extended width. A representative burner module and burner array is described in U.S. Pat. No. 8,746,013; the disclosure of which is hereby incorporated by reference. Thus, a soot generator can be used to form an individual layer of soot having a substantially homogeneous chemical composition and a substantially uniform thickness over a particular area on the dense glass substrate. The area of coverage can be expanded by moving the dense glass substrate and/or soot generator to apply soot particles over additional regions of the deposition surface of the dense glass substrate. By "uniform composition" and "uniform thickness" is meant that the composition and thickness variation over a given area is less than or equal to 20% of an average composition or thickness. In certain embodiments, one or both of the compositional and thickness variation of a soot sheet can be less than or equal to 10% of their respective average values over the soot sheet.

A representative burner may include 9 columns of gas orifices. During use, according to one embodiment, the centerline column (e.g., column 5) provides a silica gas precursor/carrier gas mixture and the immediately adjacent columns (e.g., columns 4 and 6) provide oxygen gas for stoichiometry control of the silica gas precursor. The next two columns of gas orifices on either side of the centerline (e.g., columns 2, 3, 7 and 8) provide additional oxygen, the flow rate of which can be used to control stoichiometry and soot density, and provide an oxidizer for the ignition flame. The outermost columns of orifices (e.g., columns 1 and 9) can provide an ignition flame mixture of, for example, $CH_4/O_2$ or $H_2/O_2$. Example gas flow rate ranges for such a 9 column linear burner are listed in Table 1.

TABLE 1

Example gas flow rates for 9 column linear burner

| Gas | Burner column(s) | Example flow rate |
| --- | --- | --- |
| OMCTS | 5 | 15 g/min |
| $N_2$ | 5 | 40 SLPM |
| $O_2$ | 4, 6 | 18 SLPM |
| $O_2$ | 2, 3, 7, 8 | 36 SLPM |
| $CH_4$ | 1, 9 | 36 SLPM |
| $O_2$ | 1, 9 | 30 SLPM |

In addition to burners, other soot-generating devices, such as a plasma heated soot sprayer, and the like, can be used to provide the soot particles needed for the process. In a plasma-heated soot sprayer, pre-formed soot particles, of a single or multiple compositions, are provided at a certain velocity and allowed to pass through a plasma, which heats the soot particles to a desired temperature for deposition. Further, in certain embodiments, a combination of a burner and a plasma-heated soot sprayer may be used to provide the glass soot particles. For the purpose of convenience, unless specified to the contrary, "burner" is used herein to represent all soot-generating devices useable for the process unless specified to the contrary.

Operation of the soot-generating device typically involves chemical reactions between precursor chemicals (e.g., gaseous compounds) to form glass soot particles. Optionally, the chemical reactions can be further assisted by supplemental energy sources such as plasma or a supplemental heating device.

Silicon-containing precursor compounds, for example, can be used to form silica soot particles that can be sintered to form silica glass. An example silicon-containing precursor compound is octamethylcyclotetrasiloxane (OMCTS). OMCTS can be introduced into a burner or burner array together with $H_2$, $O_2$, $CH_4$ or other fuels where it is oxidized in a flame combustion process to produce silica soot particles. Other silicon precursors include $SiCl_4$.

For example, an exemplary burner in the production of silica glass via flame hydrolysis comprises holes through which silicon-containing precursor compounds, such as OMCTS (octamethylcyclotetrasiloxane) are introduced into a flame of $H_2$, $CH_4$ or other fuels. OMCTS is oxidized in the flame to produce fine silica soot particles that are delivered to the deposition surface of the dense glass substrate.

The soot particles as provided may consist essentially of a single oxide, such as in the case of production of undoped silica glass. Alternatively, the soot particles may be doped when produced by the soot-generating device. When the soot-generating device includes a burner for generating soot by a flame hydrolysis or flame combustion process, doping can be accomplished by including precursors of the dopants in the flame. The doping precursors can be supplied to separate ports of the soot-generating device or supplied as a mixture with silica or other base glass precursors to the soot-generating device. When the soot-generating device includes a plasma-heated soot sprayer, the pre-formed soot particles sprayed from the sprayer can be pre-doped, or alternatively, the sprayed soot particles may be subjected to an atmosphere containing the dopants such that the soot particles become doped in the plasma. In certain embodiments, the soot particles provided advantageously have an essentially homogeneous composition. In certain embodiments, the soot particles may have varying compositions. For example, soot particles of the main glass component can be provided by one soot-generating device, and soot particles of the dopants can be provided by a separate soot-generating device. In a still further example, dopants can be incorporated into a pre-existing soot layer prior to or during sintering.

Example dopants include elements from Groups IA, IB, IIA, IIB, IIIA, IIIB, IVA, IVB, VA, VB, halides, and the rare earth series of the periodic table. Doping precursors include halide compounds, hydride compounds, and organometallic compounds of the dopant. Organometallic compounds include alkoxide compounds of the dopant and compounds of the dopant with various ligands, or combinations thereof, including alkyls, alkenyls, amines, chelating ligands, ethylenediamine, acac (acetylacetonate), FOD (6,6,7,7,8,8,8-heptafluoro-2,2-dimethyl-3,5-octanedionate), acetate, 2,4-pentanedionate, 3,5-heptanedionate, 2,2,6,6-tetramethyl-3,5-heptanedionate, isopropoxide, butoxide, methoxide, and ethoxide. It is possible in certain embodiments that the soot particles can mix with each other to form composite particles with various compositions. It is also possible that in certain embodiments the soot particles are substantially prevented from adhering to each other to form mixed particles prior to being deposited to the deposition surface.

In certain embodiments, the dopant is a rare earth ion (e.g. $Yb^{3+}$, $Er^{3+}$, $Nd^{3+}$, $Tm^{3+}$, $Pr^{3+}$, $Ho^{3+}$). Rare earth doped silica-based glasses have high index and may be used as the core layer of a layered glass structure. It is known that rare earth dopants have limited solubility in silica-based glass. To improve solubility, minimize phase separation, and increase the concentration of rare earth dopants in silica glass, it is preferable to include $Al_2O_3$, $GeO_2$, $Ga_2O_3$, or oxide of another high charge density metal ion (e.g. $TiO_2$) in the glass composition. The ratio of high charge density metal oxide to rare earth dopant oxide in the glass composition may be greater than 1.0, or greater than 1.5, or greater than 2.0, or greater than 3.0, or greater than 4.0, or in the range from 1.0 to 5.0, or in the range from 1.5 to 4.0.

The soot generator may be held stationery during formation and deposition of the soot particles or, alternatively, the soot generator may be moved (e.g., oscillated or translated) with respect to the deposition surface. The dense glass substrate and soot generator may be in relative motion to each other to permit continuous soot deposition over the surface of the dense glass substrate. The relative motion may be obtained through motion of the dense glass substrate, motion of the soot generator, or motion of both the dense glass substrate and soot generator. In one embodiment, the motion of the dense glass substrate and/or soot generator may be unidirectional. The unidirectional motion may be translational motion. In another embodiment, the motion of the dense glass substrate and/or soot generator may be bidirectional. The bidirectional motion may be a reciprocating motion (e.g. back-and-forth motion). A distance from the burner output surface to the deposition surface can range from about 20 mm to 100 mm (e.g., 20, 25, 30, 35, 40, 45, 50, 55, 60, 65, 70, 75, 80, 85, 90, 95 or 100 mm). Through relative motion of the soot-generating device and the dense glass substrate, the linear rate of coverage of the deposition surface with soot particles for a soot-generating device having fixed width can range from 0.1 mm/sec to 10 m/sec. For a soot-generating device with multiple burners (e.g. a burner array), the areal coverage is given by the product of the linear rate of coverage and the width of coverage provided by the soot-generating device.

The average soot density for silica-based glasses comprising more than 90% silica is typically in the range from 0.30 to 1.50 $g/cm^3$, or in the range from 0.80 to 1.25 $g/cm^3$, or in the range from 0.40 to 0.70 $g/cm^3$.

Through reciprocating relative motion, the thickness of the deposited soot layer can be increased. The desired thickness of the soot layer may be dictated by the end use of the layered glass structure formed upon consolidation. As described more fully hereinbelow, the consolidated layered glass structure may be used as a preform in a drawing process to effect thinning of the different layers in a controlled manner to achieve waveguides of targeted dimensions. The present method thus provides advantages over other techniques (e.g. LOC) because thick soot layers can be deposited and adjusted in a post-deposition process to meet layer thickness requirements. When multiple soot layers of varying composition are deposited to form a multilayer composite structure, the relative thicknesses of the different layers may be dictated by the end use of the layered glass structure formed upon consolidation. The thickness of the soot layer can be controlled by the rate of deposition of the soot from the soot-generating device and time of deposition. Each traversal of the soot-generating device over the dense glass substrates increases the thickness of the soot layer. The number of traversals of the soot-generating device over the dense glass substrate may be less than 200, or less than 100, or less than 50, or less than 25, or less than 10, or between 1 and 200, or between 1 and 100, or between 1 and 50, or between 1 and 25.

The thickness of a soot layer may be at least 10 μm, or at least 25 μm, or at least 50 μm, or at least 100 μm, or at least 250 μm, or at least 500 μm, or at least 1 mm, or at least 2 mm, or at least 5 mm, or at least 10 mm, or at least 15 mm, or at least 20 mm, or in the range from 10 μm to 50 mm, or in the range from 25 μm to 40 mm, or in the range from 50 μm to 30 mm, or in the range from 100 μm to 25 mm, or in the range from 150 μm to 25 mm or in the range from 200 μm to 25 mm, or in the range from 250 μm to 25 mm, or in the range from 500 μm to 25 mm.

In certain embodiments, it is desirable that the deposited soot layer has a low local soot density variation. Low local soot density variation is important for obtaining a substantially homogeneous composition of the final sintered glass layer in certain embodiments. The following factors, inter alia, impact the local soot density variation of the soot layer: (i) design and location of burners or other soot-generating devices; (ii) movement of the burner relative to the deposition surface; (iii) temperature variation of the particles provided by the burners or other soot-generating devices; and (iv) temperature variation of the deposition surface of the dense glass substrate. A soot-generating device with a burner array comprising multiple burners can be advantageously used to obtain a deposited layer of soot with a substantially homogeneous chemical composition and a substantially uniform thickness. By "uniform thickness" means the thickness variation of the soot layer is less than or equal to 20% of the average thickness of the soot layer. In certain embodiments, it is desired that the thickness variation of the soot layer is less than or equal to 10% of the average thickness of the soot layer. In certain embodiments, the movement of the burner(s) relative to the deposition surface may be modulated to facilitate production of a soot layer with substantially uniform thickness. In certain embodiments, the burner(s) are allowed to oscillate from one side of the deposition surface to the other to deposit a soot layer with substantially uniform thickness. Substantially uniform temperature on the deposition surface before the burner flame directly contacts the deposition surface can be important for obtaining a uniform local soot density in the soot layer in certain embodiments.

In the as-deposited state, the soot layer is a porous layer. In subsequent processing, the soot layer is sintered and consolidated to form a dense glass layer. In the sintering process, the soot layer is heated to a sintering temperature to densify the soot particles in the porous soot layer to form a consolidated glass layer. The consolidation may occur in a continuous or batch process. To consolidate the soot, the soot layer is heated to a sufficiently high temperature for a sufficient period of time to convert the soot into densified glass. One skilled in the art can determine the proper sintering temperature and sintering time depending on, inter alia, the composition of the glass, the desired quality of the final glass, and the throughput of the process. For example, to sinter a soot sheet of high purity silica, it is typically desired that the sintering temperature be from 1000° C. to 2000° C., in certain embodiments from 1400° C. to 1600° C. As is typically known by one skilled in the art, during the sintering stage, the soot particles forming the soot layer are allowed to form more chemical bonds at the grain boundary to result in a larger, continuous and densified glass network. In certain embodiments, it is desirable that the sintering results in a glass material essentially free of voids and gas bubbles.

The thickness of a consolidated soot layer may be at least 10 µm, or at least 25 µm, or at least 50 µm, or at least 100 µm, or at least 200 µm, or at least 300 µm, or at least 500 µm, or at least 1 mm, or at least 2 mm, or at least 5 mm, or at least 10 mm, or at least 15 mm, or at least 20 mm, or in the range from 1 µm to 25 mm, or in the range from 5 µm to 20 mm, or in the range from 10 µm to 15 mm, or in the range from 10 µm to 10 mm, or in the range from 10 µm to 5 mm, or in the range from 25 µm to 1 mm, or in the range from 50 µm to 500 µm, or in the range from 50 µm to 250 µm, or in the range from 50 µm to 125 µm.

In certain embodiments, it is desired that at least a majority of the dense glass layer formed by sintering and consolidating the soot layer has a high surface quality: low surface waviness; low surface roughness; and essentially free of scratches. Several approaches may be adopted to obtain a high-quality surface. For example, sintering the soot layer while preventing contact of its exposed surface (the surface not in direct contact with the dense glass substrate or an underlying glass layer) with a solid object. It is believed that sintering the soot layer in a gas or vacuum environment while avoiding contact of the exposed surface to a solid object can minimize surface defects and facilitate formation of a dense glass layer from the soot layer that has a high-quality surface. Further, surface quality of a sintered glass can be affected by contaminants, such as ambient particles, introduced onto the exposed surface of the soot layer. Thus, sintering in a clean environment, such as a clean room, can help improve the quality of the surface of the sintered glass layer.

Figure 2:
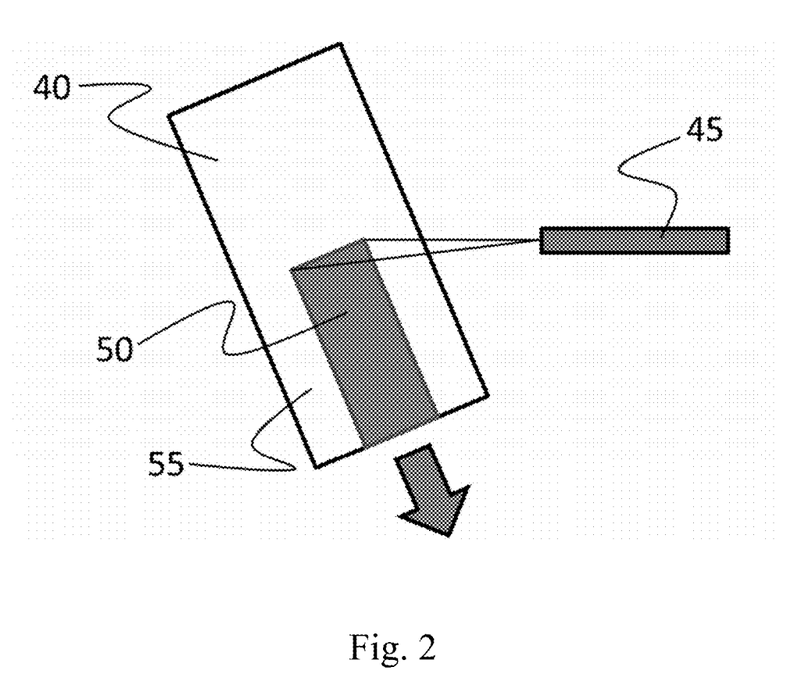
FIG. 2 depicts continuous laser sintering and consolidation of a composite structure.

Various heating source can be used to heat the soot layer to the temperature needed for sintering and consolidation. Electrical resistive heating, induction heating, and laser heating, for example, can be employed. FIG. 2 illustrates sintering and consolidation using a laser heating source. Composite structure 40 includes a dense glass substrate and one or more soot layers. Composite structure 40 is conveyed and exposed to sintering laser 45 to form sintered region 50, which is surrounded by unsintered region 55. The width of sintered region 50 can be controlled through motion or positioning of sintering laser 45 or by including multiple sintering lasers in the system. The embodiment depicted in FIG. 2 shows motion of composite structure 40 relative to sintering laser 45. In other embodiments, sintering laser 45 is in motion relative to composite structure 40. Both composite structure 40 and sintering laser 45 may be in motion in opposing directions, differing directions, or at different rates in the same direction.

Laser sintering may improve adhesion between the substrate and adjacent consolidated soot layer(s) or between consecutive soot layers in a multiple layer structure. Sintering may also improve the interface between the substrate and adjacent consolidated soot layer(s) or the interface between adjacent soot layer(s) by eliminating bubbles and/or providing smooth surfaces upon which additional soot may be deposited. Surface smoothness may be quantified by an arithmetic average roughness $R_a$. The roughness $R_a$ is the arithmetic average deviation of roughness-component fluctuations (peak heights and valley depths) from the mean position of the surface. Roughness $R_a$ can be measured with profilometers known in the art and may be reported as an average along a linear or areal portion of the surface. The surface provided by laser sintering may have a roughness $R_a$ less than 1.0 nm, or less than 0.75 nm, or less than 0.50 nm, or less than 0.35 nm, or less than 0.25 nm, or less than 0.15 nm, or less than 0.10 nm, or in the range from 0.05 nm-1.0 nm, or in the range from 0.05 nm-0.75 nm, or in the range from 0.05 nm-0.50 nm, or in the range from 0.05 nm-0.25 nm.

The area over which the surface roughness described herein is achieved coincides or approximately coincides with the area covered by the laser(s) during laser sintering. As indicated hereinabove, multiple lasers may be used to increase the coverage area of laser sintering. Alternatively, a single laser or multiple lasers may be rastered or traversed across the surface of the multilayer structure to increase the sintered area to enlarge the area of the smooth surface having roughness as described herein. The area having the surface roughness disclosed herein may be at least 0.02 $mm^2$, or at least 0.05 $mm^2$, or at least 0.10 $mm^2$, or at least 0.25 $mm^2$, or at least 0.50 $mm^2$, or at least 1 $mm^2$, or at least 5 $mm^2$, or at least 10 $mm^2$.

The ambient atmosphere during sintering and consolidation can be separately and independently tailored to meet the needs of the production of various glass materials. The thermal history of the soot layer during sintering can affect the thickness, composition, composition homogeneity, physical properties (such as refractive index, birefringence, and the like), and homogeneity of physical properties of the dense glass layer formed from the soot layer. Thus, where homogeneous composition and/or properties are desired for the dense glass layer, it is desired that the soot layer is subjected to a substantially uniform sintering temperature during sintering. Induction heating, electrical resistive heating, or laser heating can be advantageously used for obtaining a substantially uniform sintering temperature.

The distance of the heating source from the exposed surface of the soot layer during sintering may be in the range from 0.5 mm to 50 mm, or in the range from 1 mm to 45 mm, or in the range from 2 mm to 40 mm, or in the range from 3 mm to 35 mm, or in the range from 5 mm to 30 mm. Laser heating can be accomplished by directing one or more laser beams from one or more lasers to the surface of the soot layer. Multiple lasers may be employed and arranged as an array or bank of lasers to achieve, for example, broad area coverage of the soot layer to sinter multiple regions of the soot layer simultaneously. Alternatively, broad area coverage can be achieved by rastering one or more lasers. The one or more lasers can be moved in a controlled pattern to traverse the surface of the soot layer (in full or in part) to effect sintering and consolidation over desired regions. Lasers of different wavelengths may be employed, where the wavelength of each laser is optimized for a particular soot composition. The lasers may be focused or unfocused. Multiple layers of soot may be sintered in sequence or simultaneously. The wavelength or depth of focus of a laser may be adjusted to sinter sub-surface regions of a soot layer or intervening soot layers in a stack of two or more soot layers that are positioned between the dense glass substrate and the soot layer furthest removed from the dense glass substrate.

In certain embodiments, the heating chamber in which sintering takes place is filled with an inert gas, such as $N_2$, Ar, Ne, mixtures thereof, and the like, to improve heat transfer and to prevent oxidation of the component of the apparatus, the soot layer, the dense glass layer formed from the soot layer and/or the dense glass substrate.

Composite structures can be formed by depositing one or more soot layers on a dense glass substrate. The one or more soot layers may have compositions that are the same or different. The compositions of the one or more soot layers may be the same or different from the composition of the dense glass substrate. In one embodiment, the composition of the dense glass substrate has a higher index of refraction than the composition of the soot layer. The dense glass substrate, for example, may have the composition of the core layer of a waveguide and a soot layer may have the composition of a cladding layer of a waveguide. In another embodiment, the composition of the dense glass substrate has a lower index of refraction than the composition of the soot layer. The dense glass substrate, for example, may have the composition of the cladding layer of a waveguide and a soot layer may have the composition of a core layer of a waveguide.

The composite glass structure may include two or more soot layers. The two or more soot layers may be deposited sequentially on each other on the same side of the dense glass substrate to form a multilayer structure having soot layers that are the same or different in composition. The dense glass substrate, for example, may have the composition of a cladding layer of a waveguide, a soot layer having the composition of a core layer of a waveguide may be deposited on the dense glass substrate, and a soot layer having the composition of a cladding layer of a waveguide may be deposited on the soot layer having the composition of a core layer of a waveguide. In such a composite structure, the soot layer having the composition of a core layer has a higher refractive index than either the dense glass substrate or the soot layer having the composition of a cladding layer.

In one embodiment, a soot layer having the composition of a core layer is deposited on a dense glass substrate and a soot layer having the composition of a cladding layer is deposited on the soot layer having the composition of a core layer. In another embodiment, a soot layer having the composition of a cladding layer is deposited on a dense glass substrate, a soot layer having the composition of a core layer is deposited on the soot layer having the composition of a cladding layer, and a soot layer having the composition of a cladding layer is deposited on the soot layer having the composition of a core layer. The soot layer(s) having the cladding composition may be thicker than the soot layer having the core composition. The soot layer(s) having the cladding composition may be thicker than the soot layer having the core composition by a factor of at least 5, or a factor of at least 10, or a factor of at least 25, or a factor of at least 50, or a factor of at least 100, or a factor between 5 and 100, or a factor between 10 and 100, or a factor between 10 and 90, or a factor between 25 and 75.

Alternatively, the two or more soot layers may be deposited on different surfaces of the dense glass substrate. The different surfaces may be opposing surfaces or non-overlapping surfaces. The dense glass substrate, for example, may have the composition of a core layer of a waveguide, a first soot layer having the composition of a cladding layer of a waveguide may be deposited on a first surface of the dense glass substrate, and a second soot layer having the composition of a cladding layer of a waveguide may be deposited on a second surface of the dense glass substrate, where the second surface is on a side of the dense glass substrate opposite the first surface so that the dense glass substrate is situated between the first and second soot layers. In such a composite structure, the dense glass substrate has a higher refractive index than either of the two surrounding soot layers. Two or more soot layers may be deposited on each of two or more surfaces of the dense glass substrate.

When two or more soot layers are deposited, deposition of all soot layers may occur before sintering and consolidation and all soot layers may be subjected to sintering and consolidation conditions simultaneously. Alternatively, deposition of soot layers and sintering and consolidation may alternate. For example, a soot layer may be formed on a dense glass substrate, sintered and consolidated to form a dense glass layer, and one or more additional soot layers may be deposited on the dense glass layer. The one or more additional soot layers may then be sintered and consolidated and yet an additional one or more soot layers may then be deposited.

The densified layered structure (also referred to herein as a layered glass structure) formed after sintering and consolidation of the composite structure may be further processed. Additional processing may include drying the soot layer (e.g. with $Cl_2$), doping the soot layer, machining to form a desired shape, polishing, annealing, cutting etc. The additional processing may also include drawing. In the draw process, the densified layered structure is heated to softening and then thinned by drawing in a selected drawing direction. During drawing, the densified layered structure is stretched and resolidified by cooling. Drawing may be accomplished by pulling or otherwise applying force to the softened densified layered structure, or by allowing the softened densified layered structure to thin under the action of gravity.

As the densified layered structure is stretched, it thins and one or more linear dimensions (e.g. thickness, length, height) of the dense glass substrate and the one or more dense glass layers formed from soot decreases. In one embodiment, the relative thicknesses (or other corresponding linear dimension) of the dense glass substrate and each of the one or more dense glass layers remain constant. That is, the proportional relationship between the relative thicknesses (or other corresponding linear dimension) of the dense glass substrate and each of the one or more dense glass layers remain the same as the densified layered structure thins upon drawing. In one embodiment, proportionality is retained in two linear dimensions (e.g. height and width, where height may correspond to thickness) upon drawing.

Figure 3:
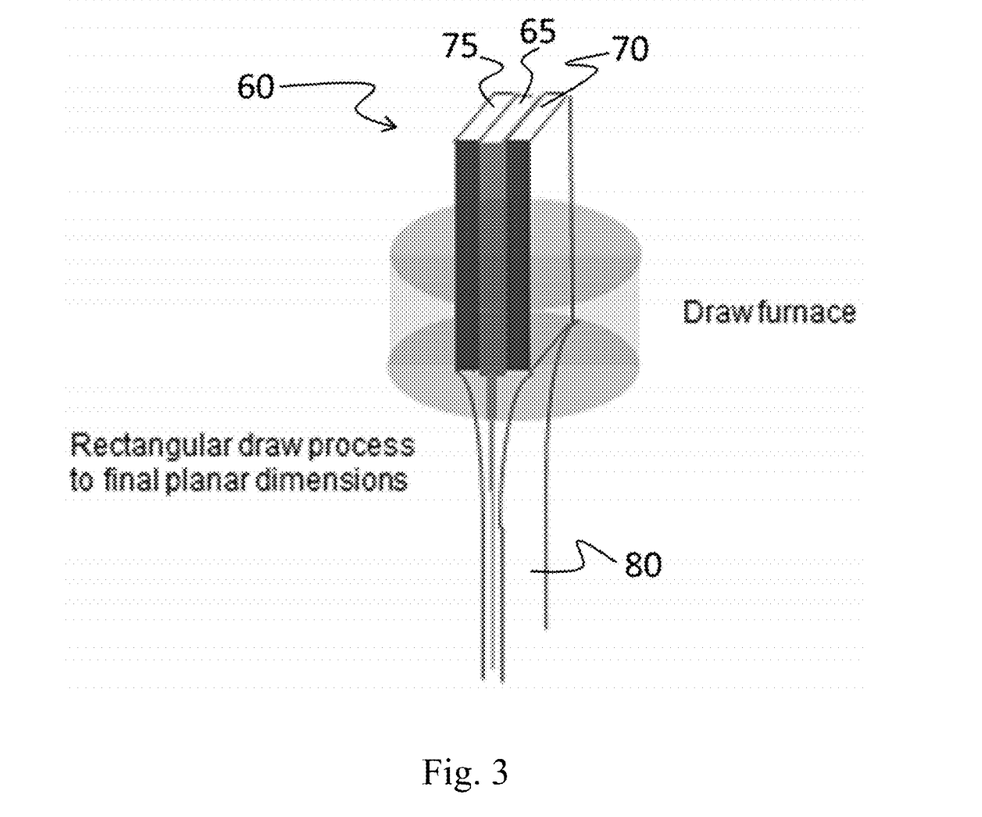
FIG. 3 shows adjustment of the dimensions of a multiple layer glass structure using a draw process.

FIG. 3 schematically depicts drawing of a planar waveguide from a densified layered structure. Densified layered structure 60 includes core layer 65, cladding layer 70, and cladding layer 75. Densified layered structure 60 is placed in a draw furnace, heated to softening and drawn to final dimensions under the action of gravity and/or in a tension-assisted process to form drawn layered structure 80.

The drawing process permits control over the thickness (or other linear dimension) of the layered glass structure. The thickness (or other linear dimension) of the core and cladding layers of a waveguide, for example, can be controlled through the drawing process. The thickness (or other linear dimension) of a layer in the layered glass structure after drawing may be at least 0.1%, or at least 1%, or at least 2%, or at least 5%, or at least 10%, or at least 20%, or at least 40%, or at least 50%, or at least 60%, or at least 75% of the thickness (or other linear dimension) of a layer in the layered glass structure before draw. The thickness (or other linear dimension) of a layer in the layered glass structure after drawing may be in the range from 0.01% to 99%, or in the range from 1% to 95%, or in the range from 2% to 90%, or in the range from 5% to 85%, or in the range from 10% to 80%, or in the range from 20% to 70%, or in the range from 30% to 60% of the thickness (or other linear dimension) of a layer in the layered glass structure before draw.

In one embodiment, the densified layered structure has a linear dimension in the direction of drawing and the drawing process increases the linear dimension by at least 5%, or at least 10%, or at least 25%, or at least 50%, or at least 100%, or at least 250%, or at least 500%, or in the range from 10%-500%, or in the range from 50%-250% to form the drawn densified layered structure. The linear dimension of the drawn densified layered structure in the direction of drawing may correspond to the length of the drawn densified layered structure. The length of the drawn densified layered structure may be greater than 0.1 m, or greater than 0.3 m, or greater than 0.5 m, or greater than 1.0 m, or greater than 2.0 m, or in the range from 0.1 m-5.0 m, or in the range from 0.2 m-4.0 m, or in the range from 0.5 m-3.5 m, or in the range from 1.0 m-3.0 m. The drawn densified layered structure also has a linear dimension transverse to the direction of drawing. The direction of drawing may correspond to the length of the drawn densified layered structure and the direction transverse to the direction of drawing may correspond to the width of the drawn densified layered structure. The drawing process may increase the linear dimension of the densified layered structure in the direction of drawing relative to the linear dimension of the densified layered structure in the direction transverse to the direction of drawing. The ratio of the linear dimension of the drawn densified layered structure in the direction of drawing to the linear dimension of the drawn densified layered structure in the direction transverse to the direction of drawing may be at least 2.0, or at least 3.0, or at least 5.0, or at least 10, or at least 15, or at least 20, or at least 25.

The drawn densified layer structure may be configured as a waveguide. Waveguides include layered structures that may include one or more planar layers. The waveguide structure may include two or more planar layers, or three or more planar layers. The waveguide structure may include a sequence of layers defining a stack of two or more waveguides, where each waveguide stack includes a core layer interposed between two cladding layers. Adjacent waveguide stacks may share a cladding layer between their respective core layers or separate cladding layers may be used in each waveguide stack. Examples of sequences of layers include (in order of arrangement): cladding-core-cladding-core-cladding . . . , or cladding-core-cladding-cladding-core-cladding . . . , or cladding-core-cladding-core-cladding-core-cladding-cladding-core-cladding . . . etc.

The waveguide features low attenuation loss, particularly relative to planar waveguides formed from ceramic materials. The attenuation loss over the wavelength range from 1000 nm-1300 nm of present waveguides is less than 0.5 dB/m, or less than 0.3 dB/m, or less than 0.1 dB/m, or less than 0.05 dB/m, or less than 0.01 dB/m.

In certain embodiments, the dense glass substrate includes a planar surface upon which deposition of the soot layer occurs. The glass may be configured as a slab (e.g. rectangular or square slab). The dense glass substrate may be formed by processing an arbitrary shape to include a planar surface. In one embodiment, the dense glass substrate is formed from an optical fiber preform by cutting or machining the preform to include a planar surface. As is known in the art, optical fiber preforms are made by depositing one or more layers of silica-based soot on a bait rod and consolidating the soot to form an optical fiber preform. In the deposition process, the silica-based soot is deposited on a rotating bait rod to form a layered porous soot body having a generally cylindrical shape. Techniques for forming the porous soot body include OVD (outside vapor deposition), IVD (inside vapor deposition), and CVD (chemical vapor deposition). Sintering and consolidation of the layered porous soot body produces a densified glass body—the optical fiber preform (from which optical fibers are drawn). The optical fiber preform may be made from silica or a silica-based glass and may include multiple layers differing in composition to provide the refractive index profile required for guiding light in an optical fiber.

The generally cylindrical optical fiber preform may be cut to form a planar surface. In one embodiment, the optical fiber preform is cut in a direction parallel to the axial direction of the optical fiber preform to provide a planar surface. Subsequent deposition of one or more soot layers as described hereinabove may occur on the planar surface. The optical fiber preform may be cut to form two or more planar surfaces and soot deposition may occur on one or more of the two or more planar surfaces. Two of the two or more planar surfaces may be parallel. The optical fiber preform may be cut to form a rectangular slab or a square slab.

A dense glass substrate formed from an optical fiber preform may have a single planar surface or a plurality of planar surfaces. A dense glass substrate formed from an optical fiber preform may have one or more planar surfaces and one or more round surfaces, where soot deposition occurs on one of the planar surfaces. In one embodiment, the dense glass substrate has two planar surfaces and rounded surfaces extending between the two planar surfaces. The two planar surfaces may be parallel.

Figure 4:
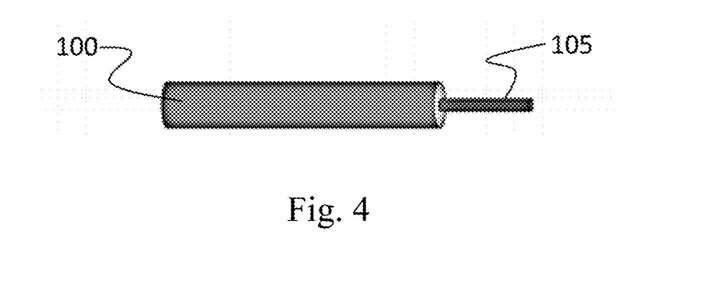
FIG. 4 depicts an optical fiber preform.
Figure 5:
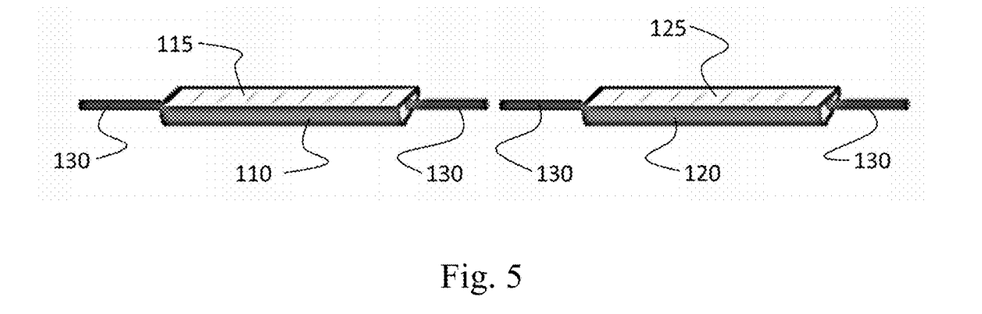
FIG. 5 depicts dense glass substrates with planar surfaces formed from an optical fiber preform.

FIGS. 4-8 illustrate formation of a layered glass structure from an optical fiber preform substrate. FIG. 4 shows optical fiber preform 100 mounted on handle 105. Handle 105 is removed and optical fiber preform 100 is cut along its axial direction to form a planar surface. In the embodiment shown in FIG. 5, optical fiber preform 100 has been cut in half to provide dense glass substrates 110 and 120. Dense glass substrates 110 and 120 have deposition surfaces 115 and 125, respectively, and are fitted with handles 130 for further processing.

Figure 6:
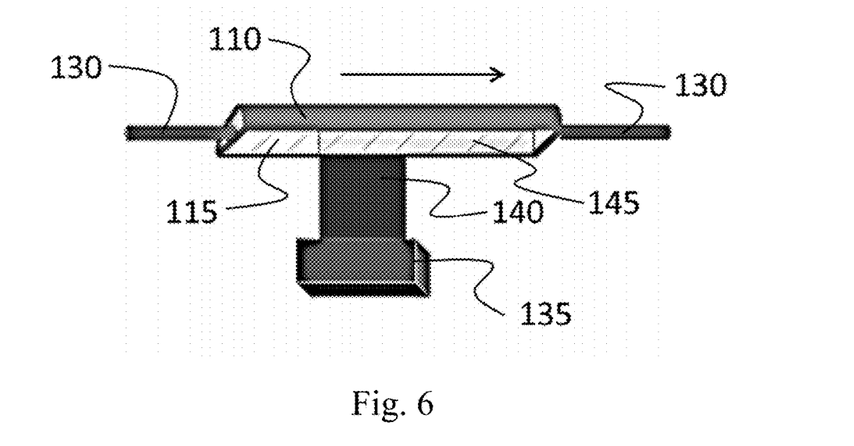
FIG. 6 illustrates deposition of a soot layer on a planar surface of a dense glass substrate.

In FIG. 6, a layer of soot is formed on dense glass substrate 110. Soot particles 140 are produced by soot-generating device 135 and deposited on deposition surface 115 to form soot layer 145. In the embodiment shown in FIG. 6, soot-generating device 135 is configured as a linear array of multiple burners. In the embodiment shown in FIG. 6, dense glass substrate is in motion and soot-generating device 135 is stationary. Dense glass substrate 110 can be traversed over soot-generating device 135 multiple times to form a soot layer having a desired thickness. Soot layer 145 may be subjected to further processing. Treatments may include drying or doping.

Figure 7:
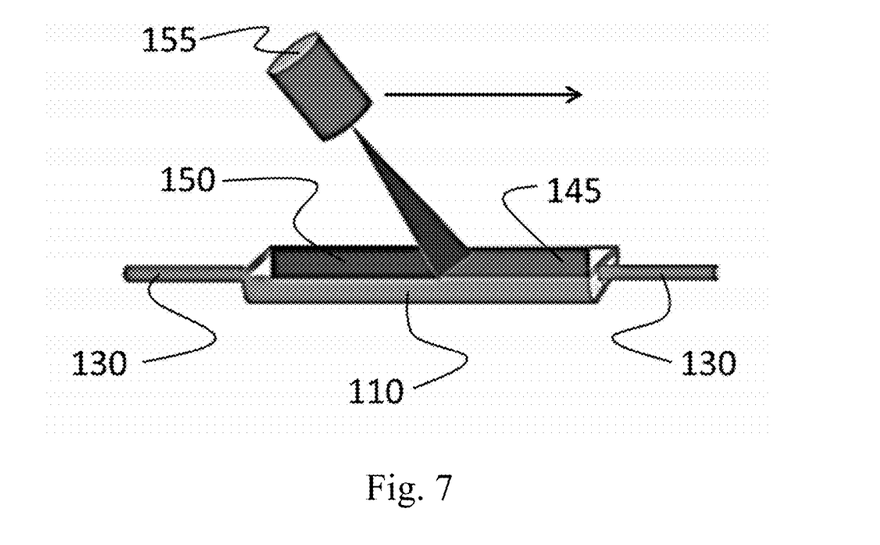
FIG. 7 shows laser sintering of a soot layer formed on a planar surface of a dense glass substrate.

FIG. 7 illustrates laser sintering. Dense glass substrate 110 with soot layer 145 is subjected to sintering with laser 155. Laser 155 traverses soot layer 145 in the direction indicated by the arrow to convert soot layer 145 to sintered layer 150. The temperature of sintering can be controlled through the power of laser 155 and the time of sintering can be controlled by the rate of traversal of laser 155 over soot layer 145 or the number of passes of laser 155 over soot layer 145. Sintered layer 150 is a dense glass layer.

Figure 8:
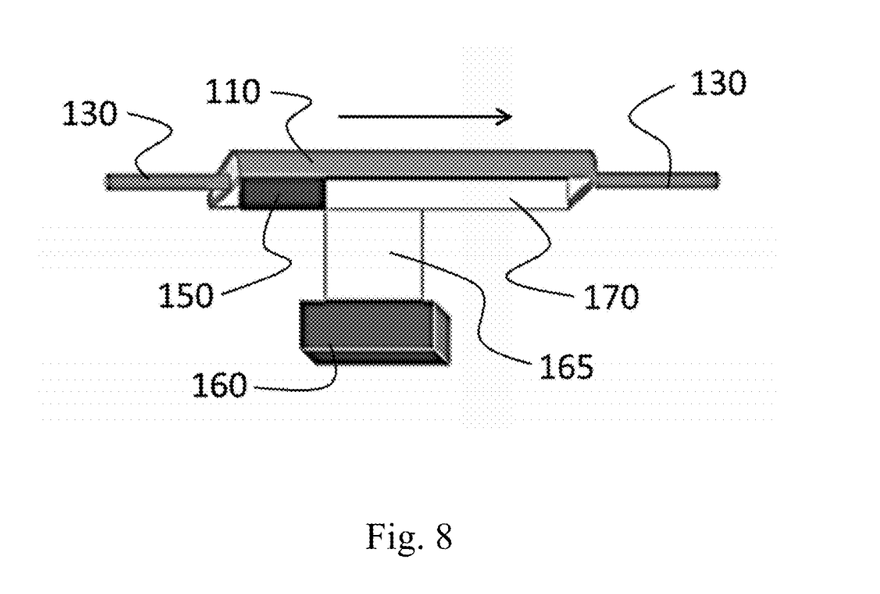
FIG. 8 shows deposition of a soot layer on a sintered layer formed on a planar surface of a dense glass substrate.

FIG. 8 illustrates deposition of an additional soot layer on sintered layer 150. Dense glass substrate 110 is traversed across soot-generating device 160, which produces soot particles 165 for deposition on sintered layer 150 to form soot layer 170. Soot layer 170 may have the same or different composition as sintered layer 150. Soot layer 170 may have the same or different composition as dense glass substrate 110. In one embodiment, dense glass substrate 110 has the composition of a cladding layer of a waveguide, sintered layer 150 has the composition of a core layer of a waveguide, and soot layer 170 has the composition of a cladding layer of a waveguide. After deposition, soot layer 170 may be subjected to further treatments, such as drying, doping, or sintering. Upon sintering of soot layer 170, the product is a layered glass structure having a dense glass substrate and two glass layers.

Figure 9:
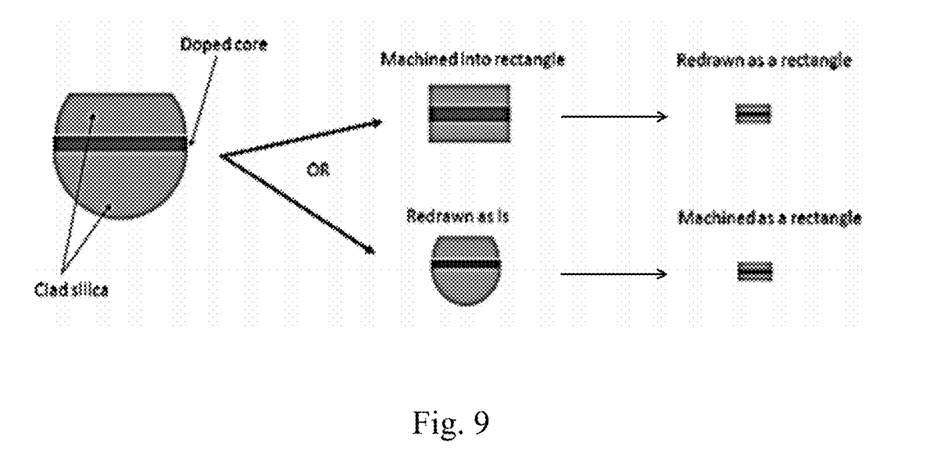
FIG. 9 shows representative processing procedures of a layered glass structure having a core surrounded by two cladding layers.

FIG. 9 illustrates additional processing steps of a layered glass structure. The layered glass structure was prepared from a dense glass substrate formed from an optical fiber preform having the composition of a cladding layer. A doped core layer is positioned on the dense glass substrate and a cladding layer is positioned on the doped core layer. Two processing pathways are shown. In one pathway, the layered glass structure is machined into a planar, rectangular shape and then drawn to adjust the thicknesses of the core and cladding layers to provide a planar waveguide. In a second process pathway, the dense glass substrate is drawn to adjust linear dimensions and then optionally machined to form a waveguide with planar, rectangular shape.

The waveguide formed from the layered glass structure may include one or more planar surfaces, or two or more planar surfaces, or a planar surface and a rounded surface. In one embodiment, the waveguide includes a rectangular core layer and a rectangular cladding layer. In another embodiment, the waveguide includes a rectangular core layer and a cladding layer with a rounded surface. In still another embodiment, the waveguide includes a rectangular core layer, a rectangular cladding layer, and a cladding layer with a rounded surface.

Other processes may be used to form the layered glass structure. In one embodiment, two or more composite structures having a dense glass substrate and one or more soot layers are prepared separately as described herein and combined to form a layered glass structure. The layered glass structure can be formed by stacking the individual composite structures in a pre-determined sequence to form a stacked structure, followed by sintering and heating the stacked structure to fuse the layers into an integrated structure.

Figure 10:
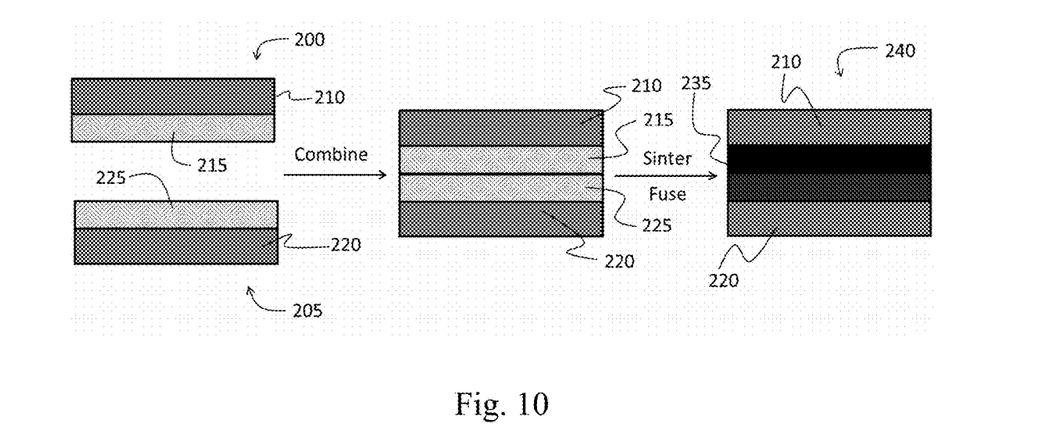
FIG. 10 shows formation of a layered glass structure by combining two composite structures.

In FIG. 10, composite structure 200 having dense glass substrate 210 and soot layer 215 is combined with composite structure 205 having dense glass substrate 220 and soot layer 225 to form a stacked structure. The compositions of any of dense glass substrate 210, dense glass substrate 220, soot layer 215, and soot layer 225 may be the same or different. Once combined, the stacked structure may be sintered to consolidate soot layer 215 and soot layer 225, and fused to form layered glass structure 240 having layers of dense glass substrate 210, dense glass substrate 220, and sintered layer 235. Embodiments in which dense glass substrate 210 and/or dense glass substrate 220 include two or more soot layers are within the scope of the present description.

Thermal fusion occurs by heating to bond the layers together to make an integrated structure. Heating can occur in a furnace or flame. Alternatively, a laser can be used for heating. In one embodiment, heating occurs in a vacuum furnace. Vacuum (or low pressure) conditions facilitate removal of gases and minimize the presence of trapped gases between layers.

Figure 11:
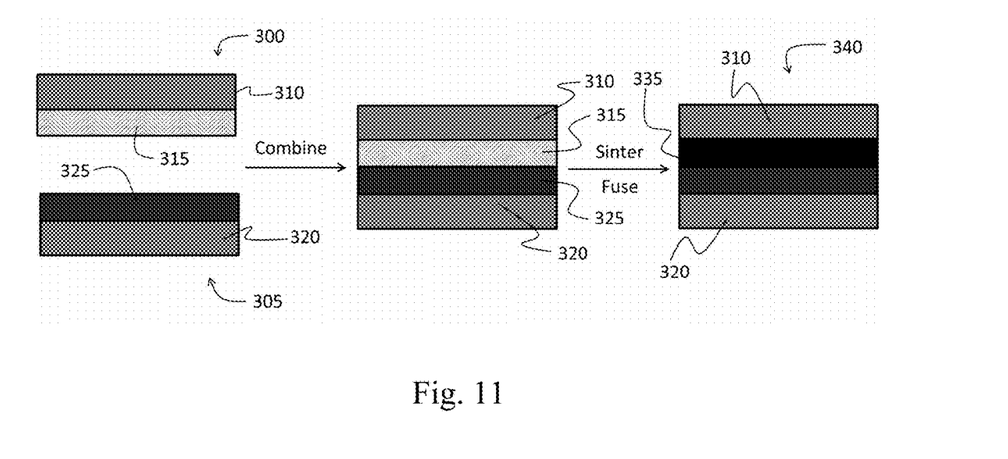
FIG. 11 shows formation of a layered glass structure by combining a layered glass structure with a composite glass structure.

FIG. 11 shows an alternative embodiment in which a layered glass structure is combined with a composite structure to form a stacked structure. Layered glass structure 305 includes dense glass substrate 320 and sintered layer 325. Composite structure 300 includes dense glass substrate 310 and soot layer 315. The compositions of any of dense glass substrate 310, dense glass substrate 320, soot layer 315, and sintered layer 325 may be the same or different. Once combined, the stacked structure may be sintered to consolidate soot layer 315 and fused to form layered glass structure 340 having layers of dense glass substrate 310, dense glass substrate 320, and sintered layer 335. Embodiments in which dense glass substrate 310 includes two or more soot layers are within the scope of the present description as are embodiments in which layered glass structure 305 includes one or more soot layers in addition to sintered layer 325 are within the scope of the present description.

Figure 12:
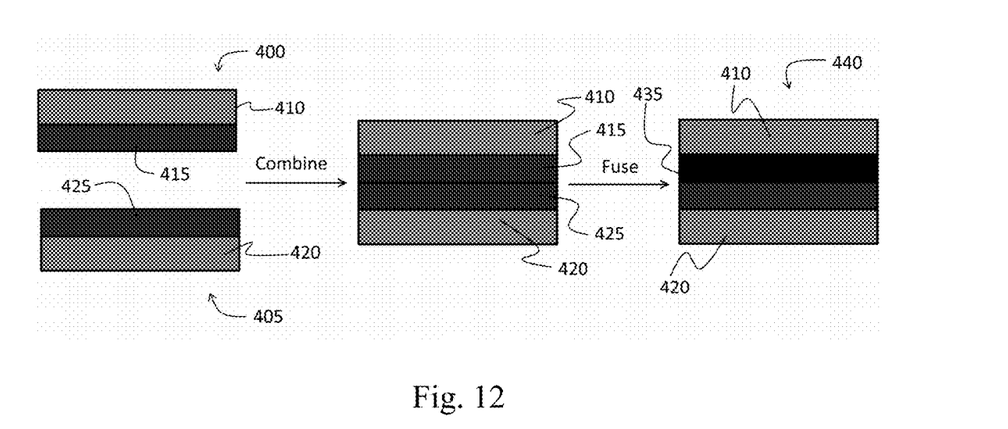
FIG. 12 shows formation of a layered glass structure by combining two layered glass structures.

FIG. 12 shows a further embodiment in which two layered glass structures are combined to form a stacked structure. Layered glass structure 405 includes dense glass substrate 420 and sintered layer 425. Layered glass structure 400 includes dense glass substrate 410 and sintered layer 415. The compositions of any of dense glass substrate 410, dense glass substrate 420, sintered layer 415, and sintered layer 425 may be the same or different. Once layered glass structure 405 and layered glass structure 400 are combined, the stacked structure may be fused to form layered glass structure 440 having layers of dense glass substrate 410, dense glass substrate 420, and sintered layer 435. Embodiments in which dense glass substrate 410 and/or dense glass substrate 410 includes one or more soot layers in addition to sintered layer 415 or sintered layer 425 are within the scope of the present description.

The processes illustrated in FIGS. 10-12 can be extended to combinations of three or more composite structures, layered glass structures, or combinations thereof.

In further embodiments, layered glass structures are fabricated or provided by combining at least one composite structure or layered glass structure as described herein with at least one glass layer formed by another process to form a stacked structure and heating the stacked structure to sinter and consolidate any soot layers and to fuse the stack to form a layered glass structure. Independent methods for making a glass layer include an OVD (outside vapor deposition), IVD (inside vapor deposition), VAD (vapor axial deposition) or direct processes. Direct processes include mixing powders of the glass constituents, heating to sinter and consolidate, and cooling to form a glass.

Figure 13:
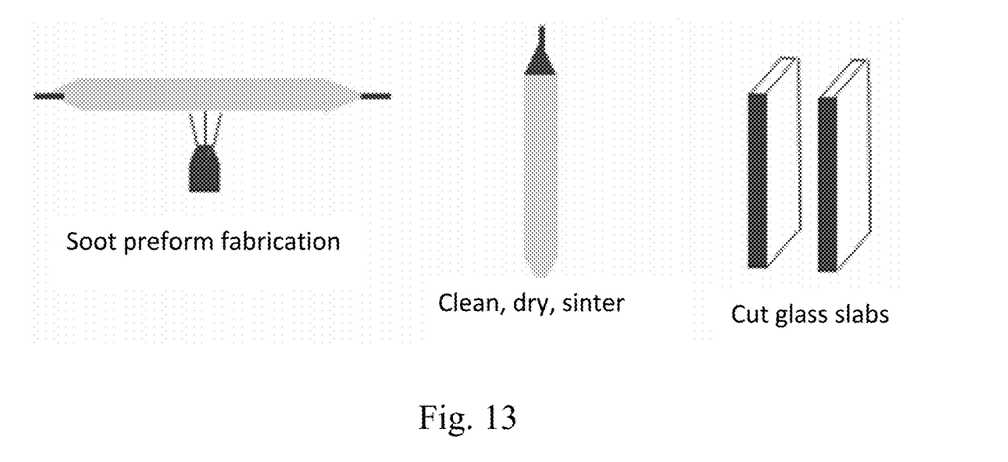
FIG. 13 shows production of glass layers by an outside vapor deposition process.
Figure 14:
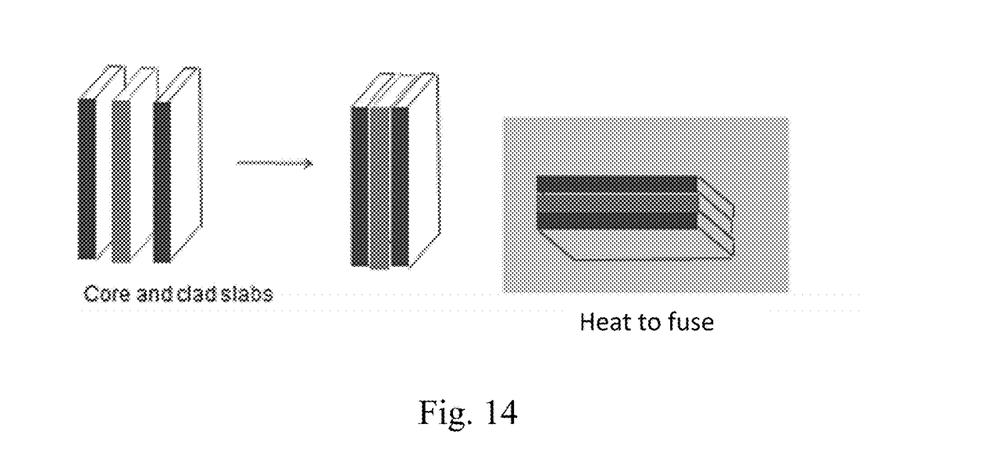
FIG. 14 shows formation of a layered glass structure from a composite structure or layered glass structure and pre-existing or independently formed glass layers.

FIG. 13 shows formation of glass layers independent of the formation of a composite structure or layered glass structure. The glass layers are formed through an OVD process in which a soot preform is formed by conventional processes (e.g. flame hydrolysis, flame combustion). The soot preform has a composition that may be the same or different from any of the layers of the composite or layered glass structures(s) with which it is to be combined. The soot preform may be dehydrated (e.g. with $Cl_2$), sintered and consolidated to form a blank. (As is known in the art, the temperature of the OVD (or IVD or VAD) process can be controlled so that sintering and consolidation occur at the time of soot deposition. Alternatively, the temperature at which soot deposition occurs is maintained below the sintering temperature and a separate sintering step may be employed. The blank is cut to form glass layers having desired dimensions. FIG. 14 shows assembly of the glass layers with a composite or layered glass structure in accordance with the present description to form a layered glass structure with three layers. The three-layer glass structure is then heated to sinter (if necessary) and fuse the layers to form a waveguide. As shown in FIG. 14, in one embodiment, the glass layers formed by the independent process may correspond to cladding layers of the layered glass structure (outermost layers depicted in FIG. 14) and the composite structure or layered glass structure (central layer depicted in FIG. 14) may correspond to the core layer of the layered glass structure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A method for making a planar layered glass structure comprising:

forming a composite structure, said composite structure including a first soot layer on a planar surface of a dense glass substrate, said first soot layer having a thickness of at least 100 μm;

preparing a layered glass structure from said composite structure, said preparing including consolidating said first soot layer; and drawing said layered glass structure along a direction of drawing to form a drawn layered glass structure, said drawn layered glass structure having a first dimension in said direction of drawing and a second dimension in a direction transverse to said direction of drawing, the ratio of said first dimension to said second dimension being at least 3.0, said consolidated first soot layer having a thickness in said drawn layered glass structure of at least 10μm.

2. The method of claim 1, wherein said first soot layer has a thickness of at least 1 mm.

3. The method of claim 1, wherein said first soot layer has a thickness in the range from 150 μm to 4 mm.

4. The method of claim 1, wherein said dense glass substrate is formed from an optical fiber preform.

5. The method of claim 1, wherein said dense glass substrate further includes a rounded surface.

6. The method of claim 1, wherein said consolidating includes heating said first soot layer to a temperature of at least 1000 ° C.

7. The method of claim 6, wherein said heating includes exposing said first soot layer to a laser.

8. The method of claim 1, wherein said consolidated first soot layer has a thickness in said drawn layered glass structure in the range from 100 μm to 25 mm.

9. The method of claim 1, wherein said consolidated first soot layer has an average surface roughness $R_a$ of less than 0.50 nm over an area of at least 1 $mm^2$.

10. The method of claim 1, wherein said drawing increases a linear dimension of said layered glass structure by 10% - 500%.

11. The method of claim 1, wherein said drawn layered glass structure has a length in the range from 0.1 m - 5.0 m.

12. The method of claim 1, wherein said ratio of said first dimension to said second dimension is at least 10.

13. The method of claim 1, wherein said drawn layered glass structure has attenuation less than 0.5 dB/m over the wavelength range from 1000 nm - 1300 nm.

14. The method of claim 1, wherein said dense glass substrate comprises a silica-based glass.

15. The method of claim 14, wherein said first soot layer comprises a silica-based glass with a dopant.

16. The method of claim 15, wherein said dopant includes a rare earth element.

17. The method of claim 16, wherein said silica-based glass with dopant includes Al, Ge, or Ti.

* * * * *

UNITED STATES PATENT AND TRADEMARK OFFICE
CERTIFICATE OF CORRECTION

PATENT NO. : 10,185,084 B2
APPLICATION NO. : 15/050589
DATED : January 22, 2019
INVENTOR(S) : Douglas Llewellyn Butler et al.

Page 1 of 1

It is certified that error appears in the above-identified patent and that said Letters Patent is hereby corrected as shown below:

On the Title Page

In Column 1, item (71), Applicants, Lines 1-7, delete "Douglas Llewellyn Butler, Painted Post, NY (US); Matthew John Dejneka, Coming, NY (US); Daniel Warren Hawtof, Coming, NY (US); Dale Robert Powers, Painted Post, NY (US); Pushkar Tandon, Painted Post, NY (US)" and insert -- Corning Incorporated, Corning, NY (US) --, therefor.

Signed and Sealed this
Twenty-second Day of October, 2019

Andrei Iancu
*Director of the United States Patent and Trademark Office*